United States Patent
Mc Clam, Jr.

(10) Patent No.: US 6,672,821 B1
(45) Date of Patent: Jan. 6, 2004

(54) LOADER APPARATUS FOR A VEHICLE

(76) Inventor: Robert D. Mc Clam, Jr., 1846 Claude Rd., Scranton, SC (US) 29591

(*) Notice: Subject to any disclaimer, the term of this patent is extended or adjusted under 35 U.S.C. 154(b) by 0 days.

(21) Appl. No.: 10/099,027

(22) Filed: Mar. 15, 2002

(51) Int. Cl.[7] ................................................ B60R 9/06
(52) U.S. Cl. ...................................... 414/462; 444/494
(58) Field of Search ................................ 414/494, 462

(56) References Cited

U.S. PATENT DOCUMENTS

| | | | | |
|---|---|---|---|---|
| 2,338,955 | A | * 1/1944 | Metcalf | 414/462 |
| 3,796,333 | A | * 3/1974 | Goldstein | 414/462 |
| 4,519,738 | A | * 5/1985 | Wood | 414/483 |
| 4,860,404 | A | 8/1989 | Flachs | |
| 4,934,894 | A | * 6/1990 | White | 414/462 |
| 5,018,651 | A | * 5/1991 | Hull et al. | 224/42.44 |
| 5,219,106 | A | 6/1993 | Glunt | |
| 5,232,329 | A | * 8/1993 | Livingston | 414/494 |
| 5,360,259 | A | * 11/1994 | Lemberger | 298/190 V |
| 5,393,194 | A | 2/1995 | Smith | |
| D374,208 | S | 10/1996 | Eva, Jr. | |
| 5,590,998 | A | 1/1997 | Wilcox | |
| 5,662,451 | A | 9/1997 | Muzzi et al. | |
| 5,975,831 | A | * 11/1999 | Martin | 414/543 |
| 6,139,247 | A | * 10/2000 | Wright | 414/462 |
| 6,378,748 | B1 | * 4/2002 | Cox | 224/511 |
| 6,461,095 | B1 | * 10/2002 | Puska | 414/462 |

FOREIGN PATENT DOCUMENTS

DE      2422109      * 11/1975 ............... 414/494

* cited by examiner

Primary Examiner—Steven A. Bratlie

(57) ABSTRACT

A loader apparatus for an all-terrain vehicle for reducing the amount of effort to load an object onto the cargo rack of an ATV includes a base member being adapted to securely fasten to a cargo rack of the all-terrain vehicle; and also includes an elongate support member having ends and being pivotally mounted to the base member; and further includes a loading and support assembly for loading and supporting the object upon the elongate support member.

1 Claim, 5 Drawing Sheets

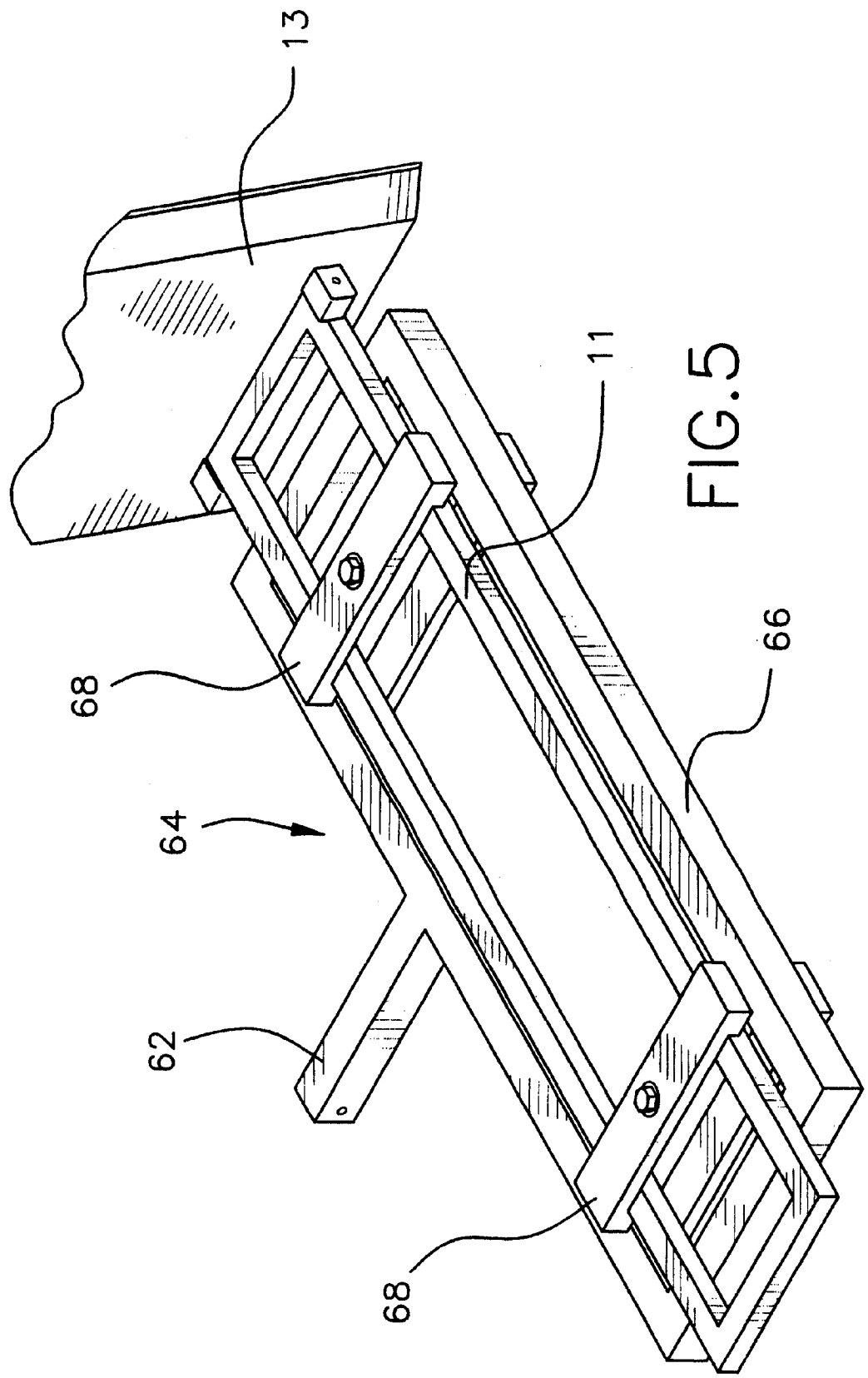

LOADER APPARATUS FOR A VEHICLE

BACKGROUND OF THE INVENTION

1. Field of the Invention

The present invention relates to a loader for a vehicle and more particularly pertains to a new loader apparatus for reducing the amount of effort to load an object such as a deer onto a vehicle.

2. Description of the Prior Art

The use of loaders is known in the prior art. More specifically, loaders heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,393,194; U.S. Pat. No. 5,662,451; U.S. Pat. No. 5,590,998; U.S. Pat. No. 4,860,404; U.S. Pat. No. Des. 374,208; and U.S. Pat. No. 5,219,106.

While these devices fulfill their respective, particular objectives and requirements, the aforementioned patents do not disclose a new loader apparatus. The inventive device includes a base member being adapted to securely fasten to either a cargo rack of the all-terrain vehicle or a mounting adapter couplable to a trailer hitch; and also includes an elongate support member having ends and being pivotally mounted to the base member; and further includes a loading and support assembly for loading and supporting the object upon the elongate support member.

In these respects, the loader apparatus for an all-terrain vehicle according to the present invention substantially departs from the conventional concepts and designs of the prior art, and in so doing provides an apparatus primarily developed for the purpose of reducing the amount of effort to load an object onto the cargo rack of an ATV.

SUMMARY OF THE INVENTION

In view of the foregoing disadvantages inherent in the known types of loader for an ATV now present in the prior art, the present invention provides a new loader apparatus for an all-terrain vehicle construction wherein the same can be utilized for reducing the amount of effort to load and carry an object.

The general purpose of the present invention, which will be described subsequently in greater detail, is to provide a new loader apparatus which has many of the advantages of the loaders referenced heretofore and many novel features that result in a new loader apparatus which is not anticipated, rendered obvious, suggested, or even implied by any of the prior art loaders, either alone or in any combination thereof.

To attain this, the present invention generally comprises a base member being adapted to securely fasten to either a cargo rack of the all-terrain vehicle or a mounting adapter couplable to a trailer hitch; and also includes an elongate support member having ends and being pivotally mounted to the base member; and further includes a loading and support assembly for loading and supporting the object upon the elongate support member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new loader apparatus which has many of the advantages of the loaders mentioned heretofore and many novel features that result in a new loader apparatus which is not anticipated, rendered obvious, suggested, or even implied by any of the prior art loaders, either alone or in any combination thereof.

It is another object of the present invention to provide a new loader apparatus which may be easily and efficiently manufactured and marketed.

It is a further object of the present invention to provide a new loader apparatus which is of a durable and reliable construction.

An even further object of the present invention is to provide a new loader apparatus which is susceptible of a low cost of manufacture with regard to both materials and labor, and which accordingly is then susceptible of low prices of sale to the consuming public, thereby making such loader apparatus economically available to the buying public.

Still yet another object of the present invention is to provide a new loader apparatus which provides in the apparatuses and methods of the prior art some of the advantages thereof, while simultaneously overcoming some of the disadvantages normally associated therewith.

Still another object of the present invention is to provide a new loader apparatus for reducing the amount of effort to load an object onto the cargo rack of an ATV.

Yet another object of the present invention is to provide a new loader apparatus which includes a base member being adapted to securely fasten to either a cargo rack of the all-terrain vehicle or a mounting adapter couplable to a trailer hitch; and also includes an elongate support member having ends and being pivotally mounted to the base member; and further includes a loading and support assembly for loading and supporting the object upon the elongate support member.

Still yet another object of the present invention is to provide a new loader apparatus that allows a user to easily lift objects weighing well over 100 pounds.

Even still another object of the present invention is to provide a new loader apparatus for an all-terrain vehicle that allows for one person to lift objects onto an ATV.

Still even another object of the present invention is to provide a new loader apparatus that facilitates carrying of an object such as a recently killed deer in a position behind a vehicle thus reducing mess and cleaning after transportation within a part of the vehicle such as in a pickup bed.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a perspective view of the base member coupled to the mounting adapter.

DESCRIPTION OF THE PREFERRED EMBODIMENT

Figure 1:
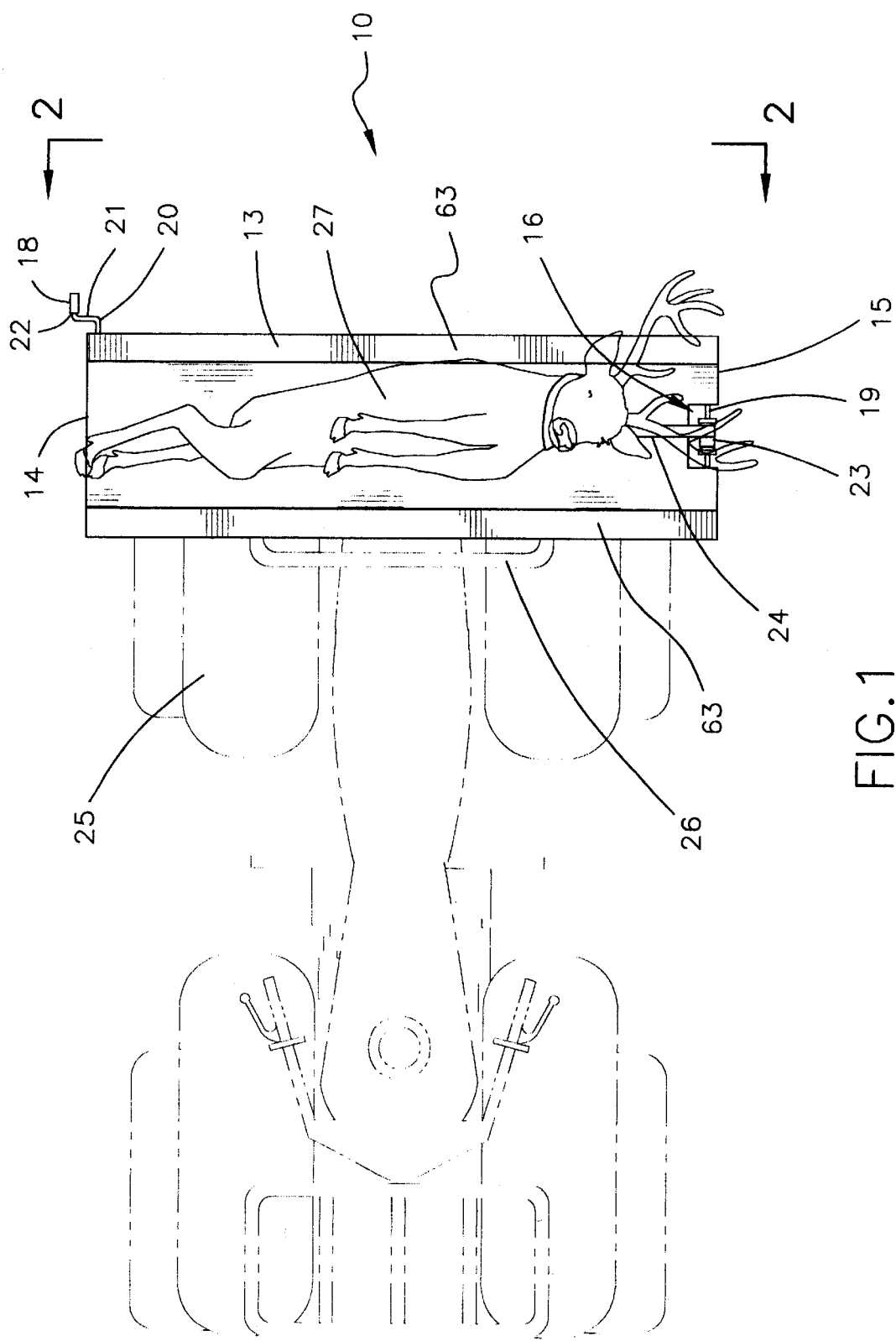
FIG. 1 is a top plan view of a new loader apparatus for an all-terrain vehicle according to the present invention.
Figure 2:
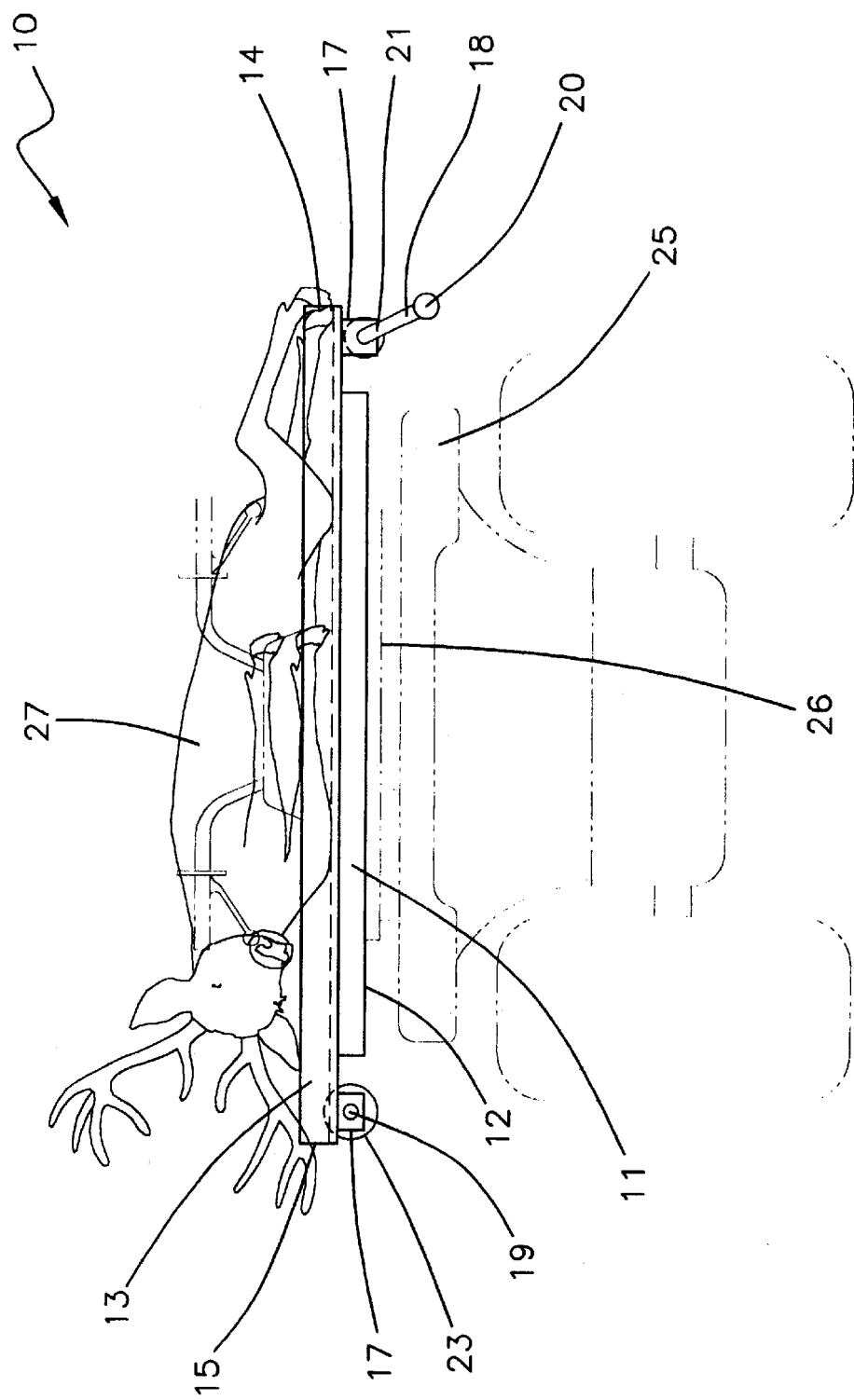
FIG. 2 is a rear elevational view of the present invention mounted upon an ATV.
Figure 3:
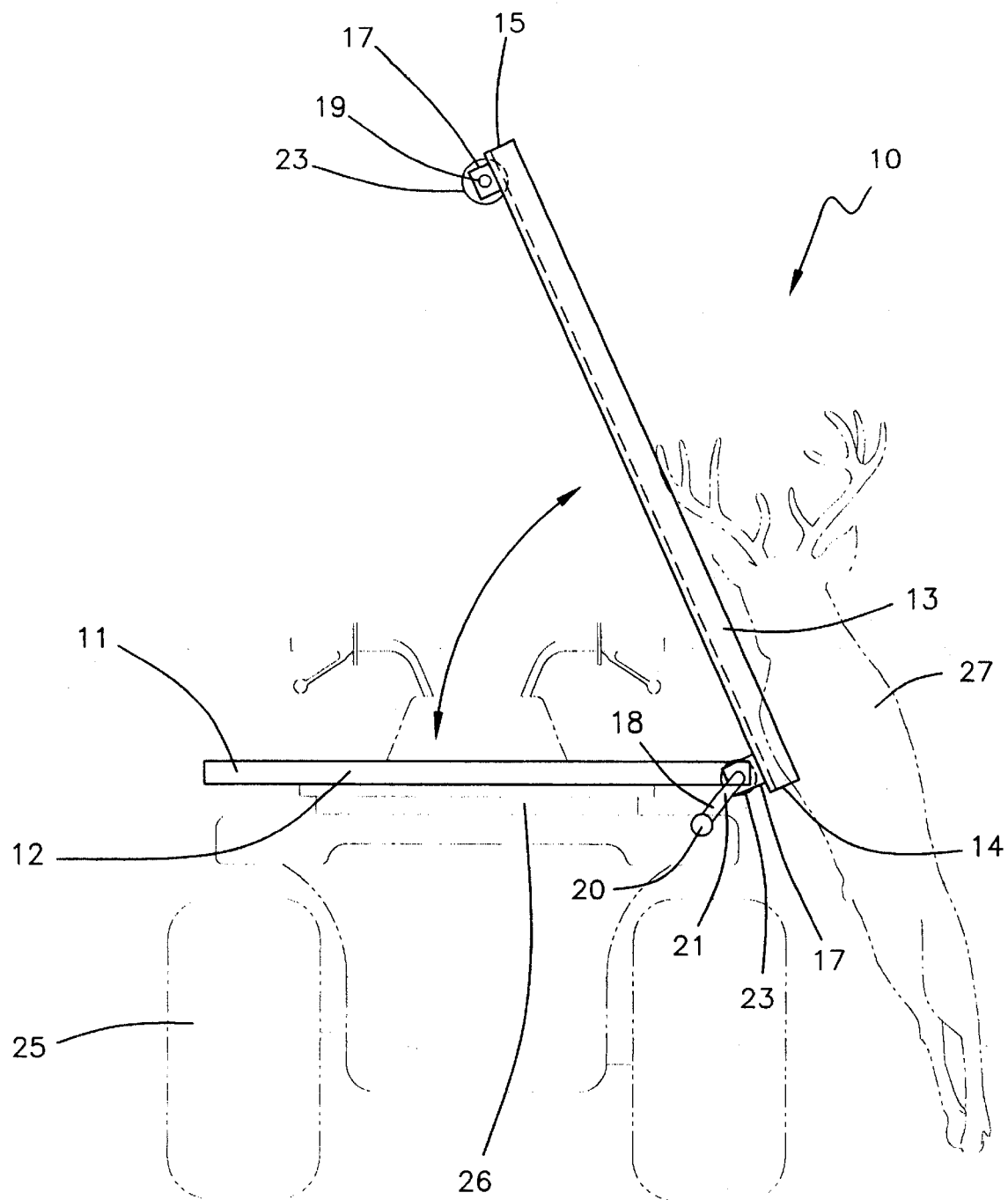
FIG. 3 is a rear elevational view of the present invention with the elongate support member pivoted into a loading position.
Figure 4:
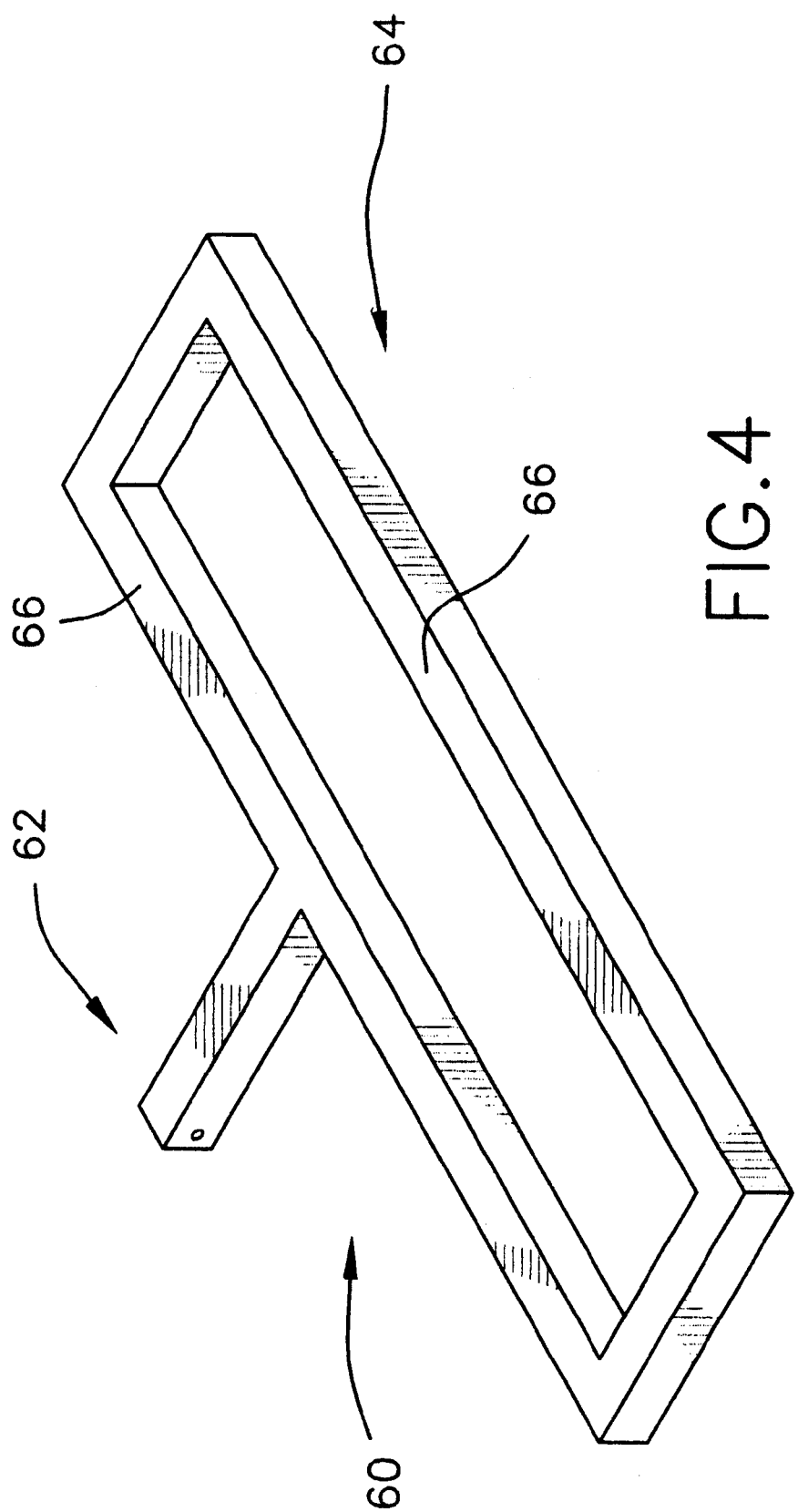
FIG. 4 is a perspective view of a mounting adapter of the present invention.

With reference now to the drawings, and in particular to FIGS. 1 through 5 thereof, a new loader apparatus embodying the principles and concepts of the present invention and generally designated by the reference numeral 10 will be described.

As best illustrated in FIGS. 1 through 5, the loader apparatus for a vehicle 10 generally comprises a base member 11 being adapted to securely fasten to either a cargo rack 26 of an all-terrain vehicle 25 or a mounting adapter 60 having a coupling portion 62 adapted for coupling to a conventional trailer hitch.

The base member 11 is essentially a frame having a plurality of tubular members 12 being arranged and disposed in a plane with the base member 11 being adapted to be horizontally disposed upon the cargo rack 26 of the all-terrain vehicle 25 with the tubular members 12 having a diameter of approximately ½ inch.

The loader apparatus 10 also includes an elongate support member 13 having ends 14, 15 and being pivotally mounted to the base member 11. The elongate support member 13 is essentially a sheet-like planar member 13 with the elongate support member 13 having a flat top side and a bottom side which is pivotally mounted to the base member 11. The elongate support member 13 has a slot 16 centrally disposed in one of the ends 15 thereof with the elongate support member 13 having a length of approximately 45 inches, and a width of approximately 13¾ inches. The elongate support member also includes upwardly projecting outer portions 63 extending along a length of the elongate support member to facilitate holding of the object 27 on the elongate support member.

Means for loading and supporting the object 27 upon the elongate support member 13 includes bracket members 17 securely and conventionally mounted to the bottom side of the elongate support member 13 at one of the ends 15 thereof. A crank member 18 is rotatably and conventionally supported by the bracket members 17 and extending therebetween. A spool member 23 is securely and conventionally mounted to the eleongate support member and is aligned with the slot 16 of the elongate support member 13. A strap member 24 is carried by the spool member 23 and is adapted to fasten around the object 27. The crank member 18 includes a shaft portion 19 and a handle portion 20 integrally attached to the shaft portion 19 with the handle portion 20 having a first portion 21 which is attached and angled relative to the shaft portion 19 and also having a second portion 22 which is attached and angled relative to the first portion 21.

Optionally, a mounting adapter 60 is provided having a coupling portion 62 adapted for coupling to a hitch on a vehicle and a mounting portion 64. The mounting portion 64 comprises a pair of coplanar spaced bars 66 for permitting attachment of the base member 11 to the mounting portion 64 using a pair of clamp members 68.

In use, the user pivots the elongate support member 13 upon the base member 11 to a substantially vertical orientation and then positions the object 27 adjacent to the top side of the elongate support member 13 and fastens or wraps the strap member 24 about the object 27 and cinches the strap member 24 by using the crank member 18 thereby lifting the object up against the top surface of the elongate support member. The elongate support member is then pivoted back down into a horizontal orientation supporting the object. The object may then be further secured or strapped to the elongate support member. An optional mounting adapter is provided having a conventional hitch connection adapted for coupling to a hitch on a vehicle. The base member is attachable to the mounting adapter to permit attachment of the device to a vehicle other than an ATV having a cargo rack.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:
1. A loader apparatus comprising:
   a mounting adapter having a coupling portion adapted for coupling to a trailer hitch of a vehicle, said mounting adapter further having a mounting portion including a pair of spaced bars, said coupling portion extending from a central portion of one of said spaced bars, said spaced bars being aligned with each other such that each of said spaced bars extends laterally outward from a longitudinal axis of said coupling portion;
   a base member having a plurality of tubular members being arranged and disposed in a plane;

a pair of clamp members securing said base member to said mounting portion of said mounting adapter such that a center of gravity of said base member is substantially aligned with said longitudinal axis of said coupling portion;

an elongate support member having ends, one of said ends being pivotally mounted to said base member such that said elongate support member is pivotable between a loading position and a carrying position; and means for loading and supporting an object upon said elongate support member;

wherein said elongate support member is essentially a sheet-like member having upwardly projecting outer portions for facilitating holding of the object on said elongate support member during use;

wherein said elongate support member has a flat top side extending between said outer portions and a bottom side which is pivotally mounted to said base member;

wherein said elongate support member has a slot centrally disposed in one of said ends thereof;

wherein said means for loading and supporting an object upon said elongate support member includes bracket members securely mounted to said bottom side of said elongate support member at one of said ends thereof, and also includes a crank member being rotatably supported by said bracket members and extending therebetween, and further includes a spool member being securely mounted to said elongate support member opposite said crank member and being aligned with said slot of said elongate support member, and also includes a strap member being carried by said spool member and being adapted to fasten about an object; and wherein said crank member includes a shaft portion and a handle portion integrally attached to said shaft portion, said handle portion having a first portion which is attached and angled relative to said shaft portion and also having a second portion which is attached and angled relative to said first portion.

* * * * *